(12) United States Patent
Lejin P J

(10) Patent No.: US 11,520,459 B1
(45) Date of Patent: Dec. 6, 2022

(54) MANAGING CIRCULAR NAVIGATION OF A MULTIPAGE USER INTERFACE

(71) Applicant: salesforce.com, inc., San Francisco, CA (US)

(72) Inventor: Jose Lejin P J, Karnataka (IN)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/708,513

(22) Filed: Mar. 30, 2022

(51) Int. Cl.
*G06F 3/04817* (2022.01)
*G06F 3/0483* (2013.01)
*G06F 3/0484* (2022.01)
*G06F 40/143* (2020.01)

(52) U.S. Cl.
CPC ........ *G06F 3/04817* (2013.01); *G06F 3/0483* (2013.01); *G06F 3/0484* (2013.01); *G06F 40/143* (2020.01)

(58) Field of Classification Search
CPC .. G06F 3/0483; G06F 3/04817; G06F 3/0484; G06F 40/143
See application file for complete search history.

(56) References Cited

U.S. PATENT DOCUMENTS

| | | | | |
|---|---|---|---|---|
| 9,830,051 | B1* | 11/2017 | Greenspan | G06Q 10/103 |
| 2016/0018953 | A1* | 1/2016 | Lynch | G06F 9/451 |
| | | | | 715/745 |
| 2017/0168663 | A1* | 6/2017 | Dziuba | G06Q 10/0631 |
| 2017/0212926 | A1* | 7/2017 | Amacker | G06F 16/2455 |
| 2018/0232200 | A1* | 8/2018 | Rabellino | G06F 3/167 |
| 2019/0324614 | A1* | 10/2019 | Brillon | G07F 17/30 |

* cited by examiner

*Primary Examiner* — Mong-Shune Chung
(74) *Attorney, Agent, or Firm* — Sterne, Kessler, Goldstein & Fox, P.L.L.C.

(57) ABSTRACT

A user device (e.g., a computing device, a smart device, a mobile device, a laptop, a tablet, a set-top box, a display device, etc.) may generate and/or display various pages (e.g., web pages, application pages, links and/or linked data, documentation, etc.) of a multipage user interface (e.g., website, application, data/content source, etc.). The user device may enable a user to avoid getting lost in circular navigation by tracking a sequence of navigation to pages of the multipage user interface and generating a breadcrumb path indicative of the sequence of navigation. The user device may generate a graphical representation of the sequence of navigation, represented as a circular path, that may be selectively displayed on a current page of the multipage user interface whenever circular navigation is detected.

20 Claims, 8 Drawing Sheets

MANAGING CIRCULAR NAVIGATION OF A MULTIPAGE USER INTERFACE

BACKGROUND

Webpages, user interface (UI) pages, and/or the like are used to view content, documentation, and/or information. Accessing the webpages, UI pages, and/or the like is conventionally performed via navigational links displayed within a website and/or application. Routinely, a user following the navigational links engages in circular navigation such that the user eventually revisits to webpages, UI pages, and/or the like that have already been viewed, visited, accessed, requested, and/or navigated to. Circular navigation creates confusion as to which webpages, UI pages, and/or the like the user needs to access to obtain specific content and increases the likelihood that the user gets lost in navigation. Conventional breadcrumb paths and/or trails have a linear orientation and do not support and/or represent circular navigation. Particularly, based on the nature of navigation, breadcrumb paths and/or trails may be exhaustively long and/or convoluted. There is a need for an effective navigational tool to support circular navigation

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Provided herein are system, apparatus, device, method, computer program product embodiments, and/or combinations and sub-combinations thereof, for managing circular navigation. A user device (e.g., a computing device, a smart device, a mobile device, a laptop, a tablet, a set-top box, a display device, etc.) may generate and/or display various pages (e.g., web pages, application pages, links and/or linked data, documentation, etc.) of a multipage user interface (e.g., website, application, data/content source, etc.). The user device may enable each page of the multipage user interface to be viewed, visited, accessed, requested, and/or navigated to, for example, by a user. According to some aspects, the user device may manage circular navigation of the multipage user interface by tracking a sequence of navigation to the pages and generating a breadcrumb path indicative of the sequence of navigation. The user device may generate a graphical representation of the sequence of navigation that may be selectively displayed on a current page of the multipage user interface whenever circular navigation is detected.

A user may avoid getting lost in circular navigation by accessing the graphical representation of the sequence of navigation and interacting with sequentially arranged indicators of each page of the multipage interface that has been previously viewed, visited, accessed, requested, and/or navigated to. Interaction with an indicator of a page that has been previously viewed, visited, accessed, requested, and/or navigated may cause the user device to display the page. The graphical representation of the sequence of navigation is a tool that helps users easily navigate through a multipage user interface by informing a user of exactly where they are within the hierarchy of the multipage user interface and proving a means to quickly revisit and/or access pages previously viewed, visited, accessed, requested, and/or navigated to. These and other technological advantages are described herein.

Figure 1:
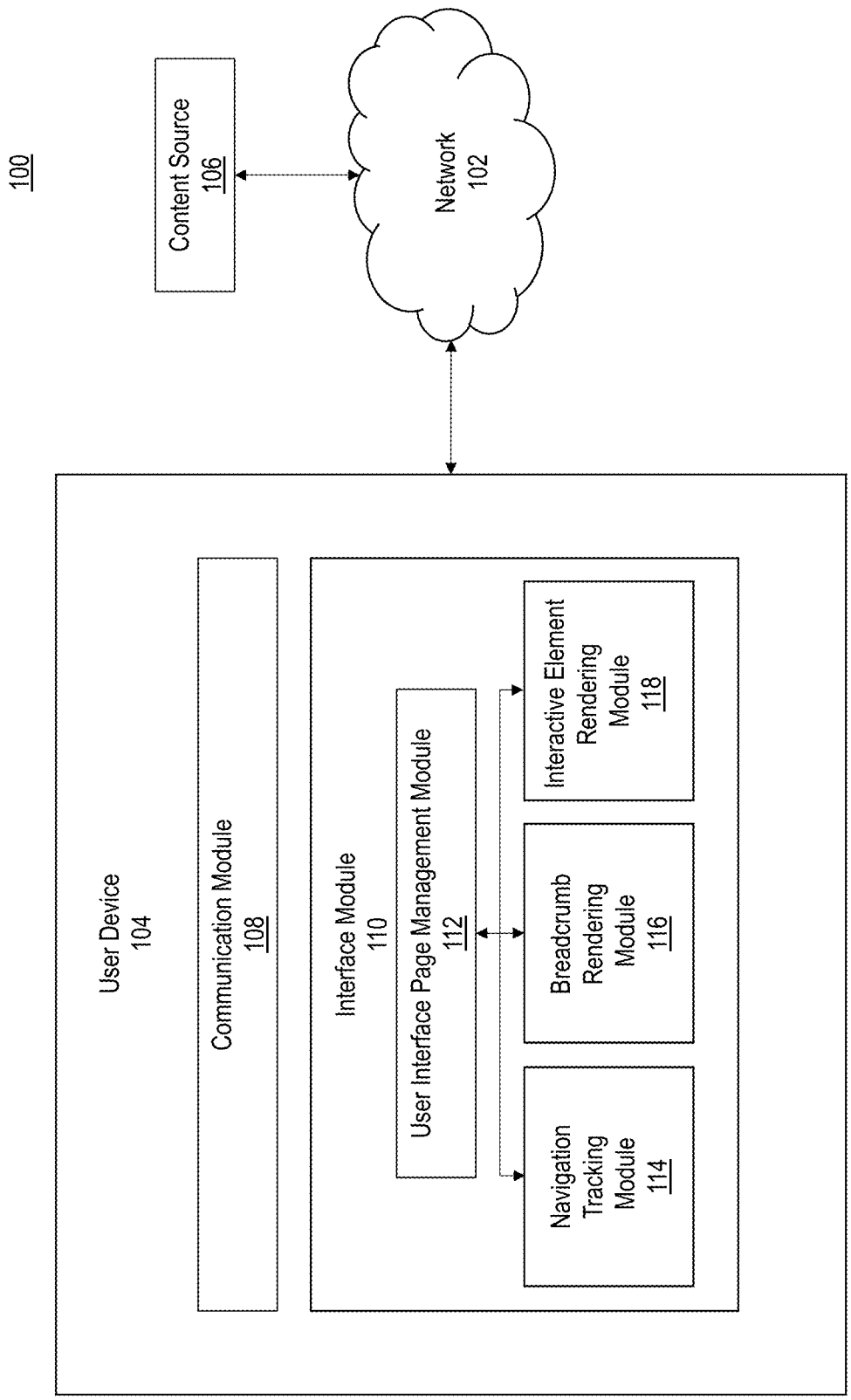
FIG. 1 shows an example system for managing circular navigation of a multipage user interface, according to some aspects.

FIG. 1 shows an example system 100 for managing circular navigation of a multipage user interface. The system 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein.

The system 200 may include a network 102. The network 102 may include a packet-switched network (e.g., internet protocol-based network), a non-packet switched network (e.g., quadrature amplitude modulation based network), and/or the like. The network 102 may include network adapters, switches, routers, modems, and the like connected through wireless links (e.g., radiofrequency, satellite) and/or physical links (e.g., fiber optic cable, coaxial cable, Ethernet cable, or a combination thereof). The network 102 may include public networks, private networks, wide area networks (e.g., Internet), local area networks, and/or the like. The network 102 may include a content access network, content distribution network, and/or the like. The network 102 may provide and/or support communication from telephone, cellular, modem, and/or other electronic devices to and throughout the system 100. For example, the system 200 may include a user device 104 in communication with a content source 106 via the network 102.

According to some aspects, the user device 104 may include a computing device, a smart device, a mobile device, a laptop, a tablet, a set-top box, a display device, or any other device capable of communicating with the content source 106. The user device 104 may include a communication module 108 that facilitates and/or enables communication with the content source 106 and/or any other device/component of the system 100. For example, the communication module 108 may include hardware and/or software to facilitate communication. The communication module 108 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 108 may include any hardware and/or software necessary to facilitate communication.

According to some aspects, the user device 104 may include an interface module 110. The interface module 110 enables a user to interact with the user device 104, the content source 106, and/or the like. The interface module 110 may include any interface for presenting and/or receiving information to/from a user.

The content source 106 may include a content server, a computing device, a web server, an application server, and/or the like. The content source 106 may provide content (e.g., data/information, video, audio, games, applications, etc.) to a user. The content source 106 may be managed by content providers, service providers, online content providers, over-the-top content providers, and/or the like. The content may be provided via a public domain, a subscription, individual item purchase or rental, and/or the like. The content may be accessed by a content browser, for example, such as a user interface page management module 112 of the interface module 110, and/or the like.

According to some aspects, the interface module 110 may include the user interface page management module 112. The user interface page management module 112 enables a user to view web application documentation and/or content, application pages, webpages, and/or any other page of a multipage user interface. For example, the user interface page management module 112 may be used to access and/or view pages and/or the like of an application configured with, and/or accessible by the user device 104. The user interface page management module 112 may be used to access and/or view pages and/or the like of a user interface (e.g., the interface module, a multipage user interface, etc.) generated by, configured with, and/or accessible by the user device 104. According to some aspects, the user interface page management module 112 may include a web browser (e.g., Internet Explorer®, Mozilla Firefox®, Google Chrome®, Safari®, or the like). The user interface page management module 112 may request or query various files from a local source and/or a remote source, such as the content source 106, and/or the like. The user interface page management module 112 may access, process and view information, pages, and applications available to it from the system 100 via the network 102.

According to some aspects, the interface module 110 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, visit, access, request, and/or navigate to a page of a multipage user interface generated and/or displayed by the interface module 110 and/or accessible via the user interface page management module 112.

According to some aspects, the interface module 110 may include a navigation tracking module 114. The navigation tracking module 114 may track each page of a multipage interface, such as a multipage website and/or the like, that is viewed, visited, accessed, requested, and/or navigated to by the user device. According to some aspects, the navigation tracking module 114 may communicate with a breadcrumb rending module 116 of the interface module 110. The navigation tracking module 114 may communicate data/information indicative of each page of a multipage interface, such as a multipage website and/or the like, that is viewed, visited, accessed, requested, and/or navigated to by the user device. The breadcrumb rending module 116 may use the data/information indicative of each page of a multipage interface, such as a multipage website and/or the like, that is viewed, visited, accessed, requested, and/or navigated to by the user device 104 to generate, render, and/or cause to be displayed a breadcrumb path, for example, within a navigational area of a page of a multipage user interface. The breadcrumb path may include and/or indicate, for example, each page of a multipage interface that is viewed, visited, accessed, requested, and/or navigated to by the user device 104 ending with the current page.

Figure 2A:
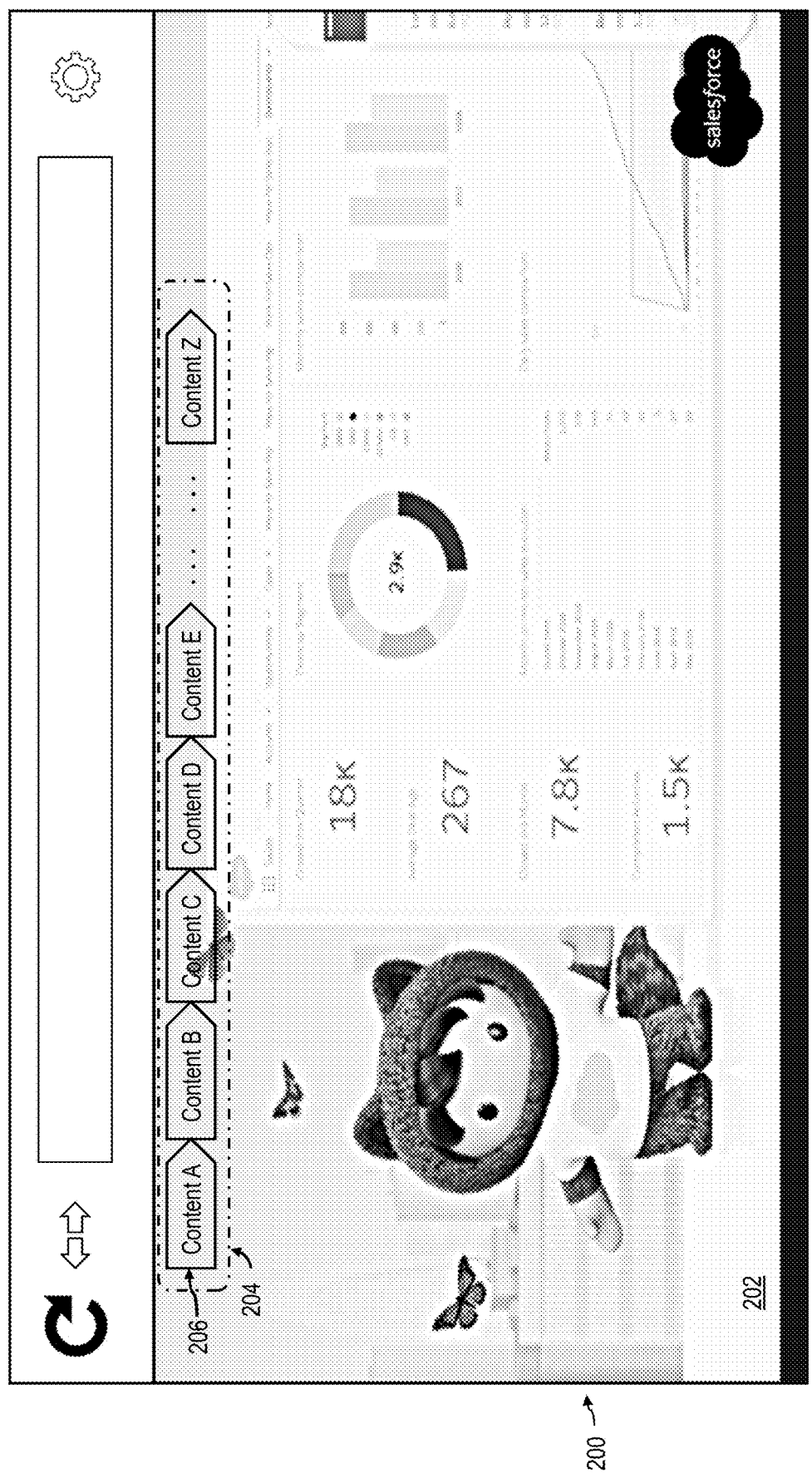
FIG. 2A-2D show example pages of a multipage user interface, according to some aspects.

FIG. 2A shows an example of a page 202 of a user interface 200 generated, accessed, and/or displayed by the interface module 110. The page 200 may include a navigational area 204 allocated for the display of a breadcrumb path 206 generated, rendered, and/or caused to be displayed by the breadcrumb rending module 116. The breadcrumb path 206 may be a full breadcrumb path appearing as a top layer of the page 202. When the breadcrumb path 206 is a full breadcrumb path, it may include each page of a multipage interface that is viewed, visited, accessed, requested, and/or navigated to by the user device, sequentially from an indicator, e.g., Content A, of the first page through an indicator, e.g., Content Z, of the current page (e.g., page 202) displayed. When the breadcrumb path 206 is not a full breadcrumb path, it may be a shortened breadcrumb path. A shortened breadcrumb path may include indicators for only pages of the multipage user interface that a shortened breadcrumb path may fit into the navigational area 204. Instead of displaying the entire breadcrumb path (from first/oldest page to last/current page), the shortened breadcrumb path may displays only indicators corresponding to the last few pages visited, accessed, requested, and/or navigated to by the user device.

Returning to FIG. 1, according to some aspects, the navigation tracking module 114 may communicate with and/or notify the breadcrumb rending module 116 when circular navigation is detected by the navigation tracking module 114. Circular navigation describes a visit, access, request for, and/or navigation to a page of the multipage user interface that has previously been viewed, visited, accessed, requested, and/or navigated to by the user device. The breadcrumb rending module 116 may modify the breadcrumb path 206 to display an indicator of the current page which is being viewed, visited, accessed, requested, and/or navigated to by the user device 104 and an indicator of the page(s) initially viewed, visited, accessed, requested, and/or navigated to by the user device 104 before originally viewing, visiting, accessing, requesting, and/or navigating to before the current page was previously viewed, visited, accessed, requested, and/or navigated to by the user device 104.

Figure 2B:
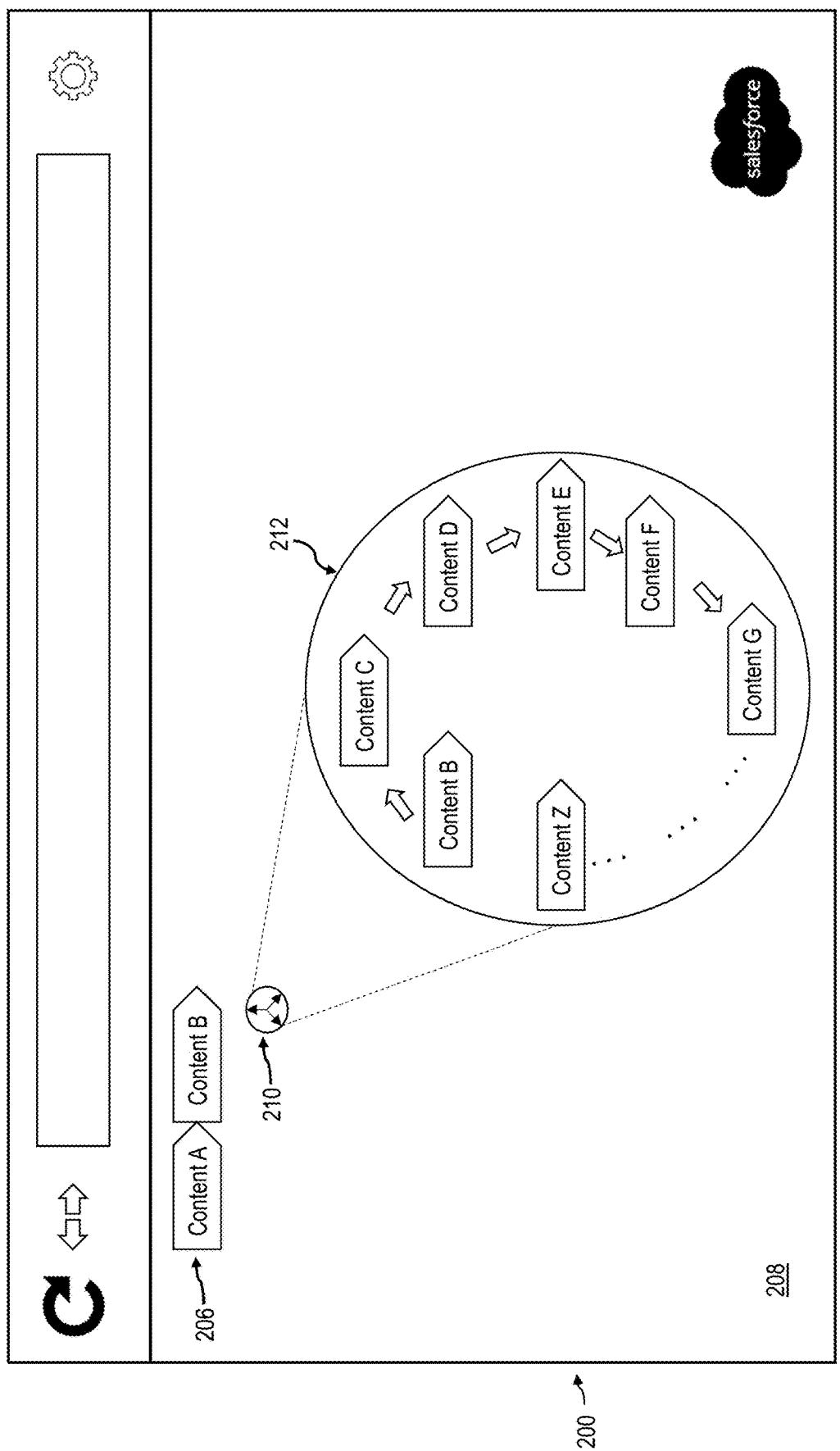

FIG. 2B shows an example page 208 of the user interface 200. The page 208 is a page that was previously viewed, visited, accessed, requested, and/or navigated to by the user device. The breadcrumb rending module 116 has modified the breadcrumb path 206 to display an indicator of the page 208, e.g., Content B, which is currently being viewed, visited, accessed, requested, and/or navigated to by the user device 104 and an indicator of the page, e.g., Content A, initially viewed, visited, accessed, requested, and/or navigated to by the user device 104 before originally viewing, visiting, accessing, requesting, and/or navigating to the page 208.

Returning to FIG. 1, according to some aspects, the interface module 110 may include an interactive element rendering module 118. The breadcrumb rending module 116 (and/or the tracking module 114) may communicate with and/or notify the interactive element rendering module 118 of a sequence of navigation whenever circular navigation is detected by the navigation tracking module 114. The sequence of navigation may indicate an order that each page of the multipage user interface is viewed, visited, accessed, requested, and/or navigated by the user device. The interactive element rendering module 118 may use data/information indicative of the sequence of navigation to generate, render, and/or cause to be displayed an interactive element in proximity to the breadcrumb path displayed on the current page. An interaction with the interactive element may cause the display of a pop-up (e.g., a graphical user interface display area, etc.) with circular breadcrumb history to be displayed. For example, a JavaScript with dynamic generation of a Document Object Model (DOM) may be used to generate, render, and/or cause display of the breadcrumb path, and scalable vector graphics implemented via JavaScript may be used to generate, render, and/or cause the pop-up to be displayed based on an interaction with the interactive element. According to some aspects, any method or technique may be used to generate, render, and/or cause to be displayed the breadcrumb path, interactive elements, and/or a pop-up including the breadcrumb history.

FIG. 2B shows an example interactive element 210. An interaction with the interactive element 210 causes the display of a pop-up 212 which includes a circular breadcrumb history of pages of the multipage user interface that were viewed, visited, accessed, requested, and/or navigated to by the user device 104 before the page 208. The breadcrumb history in the pop-up 212 may include interactive indicators (e.g., "Content B," "Content C," "Content D," "Content E," "Content F," "Content G," "Content Z," etc.) of the pages viewed, visited, accessed, requested, and/or navigated to by the user device 104. An interaction with an interactive indicator causes the user interface 200 to visit, access, request, and/or navigate to the respective page. The display of the breadcrumb history provides a user-friendly and/or clean representation of user navigation, and the ability to interact with the interactive indicators and cause navigation to the respective page enables a user to avoid getting lost in circular navigation.

Figure 2C:
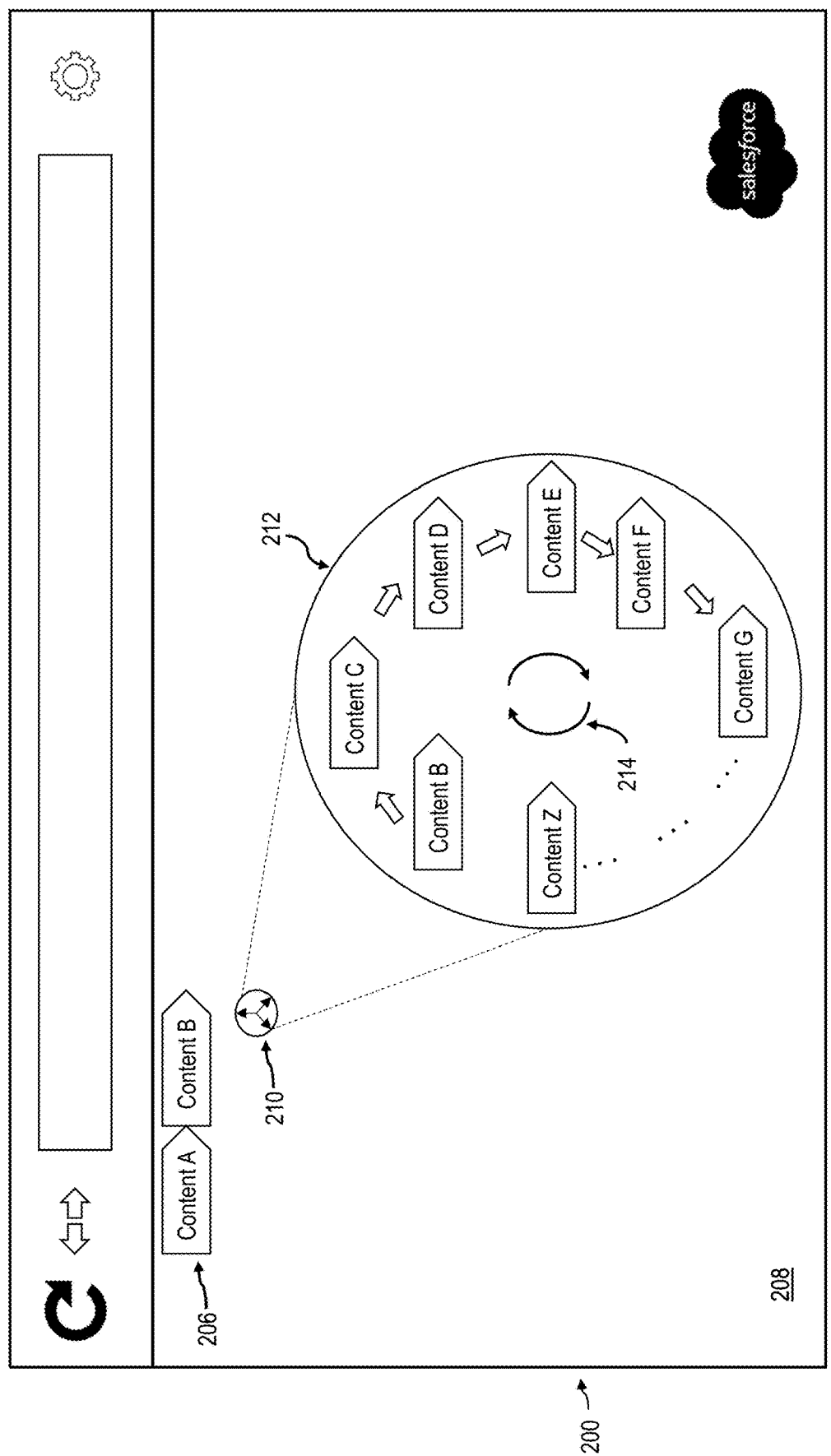

According to some aspects, as shown in FIG. 2C, if the breadcrumb history is extensive and or overflowing, the pop-up 212 may include a rotation icon 214 in its center. An interaction with an arrow of the rotation icon 214 may cause the breadcrumb history to rotate forward/backward through the bread crumb history to reveal indicators of pages that may not fit within the original pop-up 212. An interaction with an interactive indicator revealed by an interaction with an arrow of the rotation icon 214 may cause the user interface 200 to visit, access, request, and/or navigate to the respective page corresponding to the indicator.

Figure 2D:
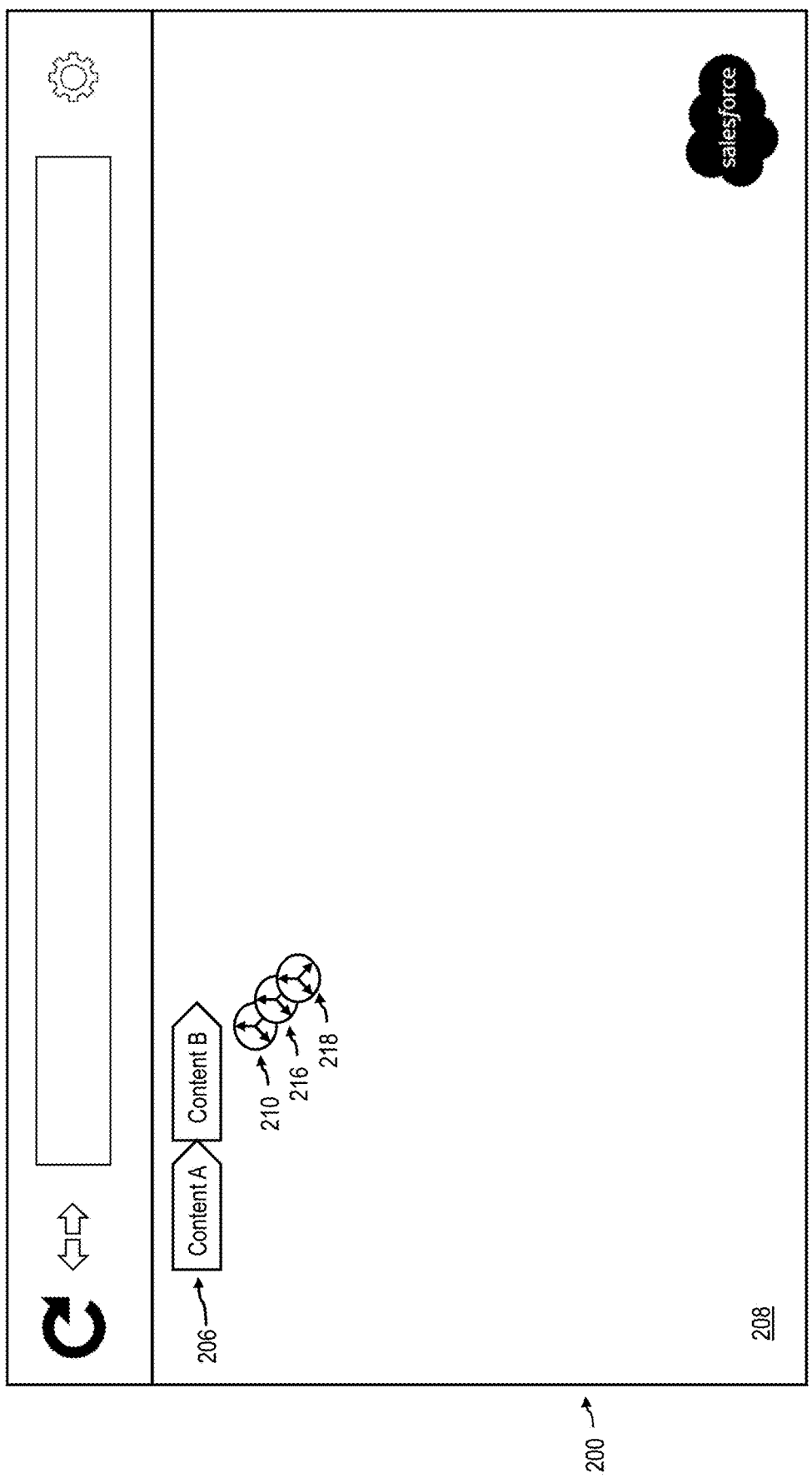

According to some aspects, the navigation tracking module 114 may inform the breadcrumb rendering module 116 and/or the interactive element rendering module 118 of each occurrence of circular navigation. Each time circular navigation is detected, the interactive element rendering module 118 may use data/information indicative of the sequence of navigation to generate, render, and/or cause to be displayed a respective interactive element on the current page. FIG. 2D shows an example of interactive elements 210, 216, and 218. Each of the of interactive elements 210, 216, and 218 correspond to different instances where circular navigation to the page 208 is detected. An interaction with the interactive elements 210, 216, and 218 causes the display of a respective pop-up which includes a circular breadcrumb history of pages of the multipage user interface that were viewed, visited, accessed, requested, and/or navigated to by the user device 104 before the page 208.

Figure 3:
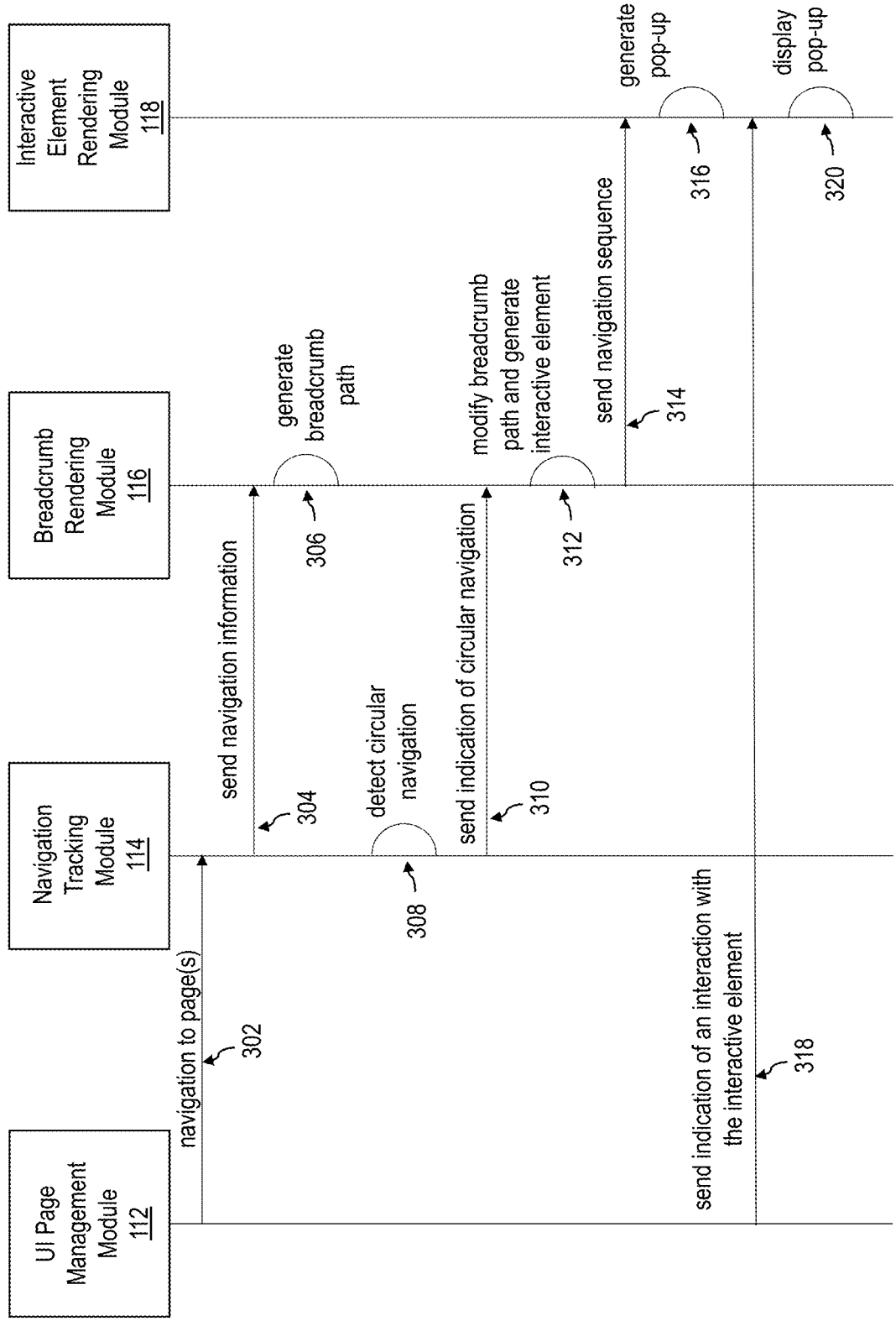
FIG. 3 shows an example communication diagram for managing circular navigation of a multipage user interface, according to some aspects.

According to some aspects, FIG. 3 shows an example communication diagram 300 for managing circular navigation of a multipage user interface. The communication diagram 300 depicts communications between and/or actions performed by components of the user device 104 of FIG. 1., such as the user interface page management module 112, the navigation tracking module 114, the breadcrumb rendering module 116, and the interactive element rendering module 118. The communications between and/or actions performed by components of the user device 104 enable a user to navigate a multipage user interface and avoid getting lost in circular navigation, while also significantly increasing the rate at which the user can visit, access, request, and/or navigate to pages of the multipage user interface that have been previously visited, accessed, requested, and/or navigate to.

In 302, the user interface management module 112 facilitates navigation to one or more pages of a multipage user interface. For example, the user interface management module 112 may receive, detect, and/or provide interaction with elements of pages (and/or documentation associated with a page), such as a keyboard entry, a mouse click, a tactile input, etc. of a page (and/or document) selection element on a displayed portion of the multipage user interface, that enables navigation to one or more pages of a multipage user interface. The user interface management module 112 sends and/or provides navigation information to the navigation tracking module 114. The navigation tracking module 114 may track each page of a multipage user interface, for example, such as a multipage website and/or the like, that is viewed, visited, accessed, requested, and/or navigated to by the user device.

In 304, the navigation tracking module 114 tracks a sequence of navigation to each of two or more pages of a multipage user interface. The navigation tracking module 114 may store the sequence of navigation. The navigation tracking module 114 sends navigation information, for example, such as the sequence of navigation determined from tracking, to the breadcrumb rendering module 116. The sequence of navigation may indicate an order in which pages of the multipage user interface are viewed, visited, accessed, requested, and/or navigated by the user device.

In 306, the breadcrumb rendering module 116 uses the navigation information to generate, render, and/or cause to be displayed a breadcrumb path, for example, within a navigational area of a page (e.g., a current page, etc.) of a multipage user interface. The breadcrumb path may include and/or indicate, for example, each page of a multipage interface that is viewed, visited, accessed, requested, and/or navigated to by the user device 104 ending with the current page.

In 308, the navigation tracking module 114, for example, based on tracking navigation to various pages, detects and/or determines instances of circular navigation. According to some aspects, circular navigation may include a visit, access, request for, and/or navigation to a page of the multipage user interface that has previously been viewed, visited, accessed, requested, and/or navigated to by the user device.

In 310, the navigation tracking module 114 sends an indication of the circular navigation to the breadcrumb rendering module 116.

In 312, the breadcrumb rendering module 116 modifies the breadcrumb path and generates an interactive element that is displayed in proximity to the modified breadcrumb path. The breadcrumb rendering module 116 may modify the breadcrumb path by causing the breadcrumb path to reset at the start of the circular navigation and/or indicate the current page associated with the circular navigation. The breadcrumb rendering module 116 may generate an interactive element, such as an expandable icon (e.g., a click to expand icon, etc.) and/or indicator element.

In 314, the breadcrumb rendering module 116 sends an indication of the sequence of navigation, including information detailing the circular navigation, to the interactive element rendering module 118. The sequence of navigation may indicate an order that each page of the multipage user interface is viewed, visited, accessed, requested, and/or navigated to by the user device. The interactive element rendering module 118 may use data/information indicative of the sequence of navigation to generate, render, and/or cause to be displayed an interactive element in proximity to the breadcrumb path displayed on the current page. An interaction with the interactive element may cause display of a pop-up with circular breadcrumb history to be displayed. For example, a JavaScript with dynamic generation of a Document Object Model (DOM) may be used to generate, render, and/or cause to be displayed the breadcrumb path and scalable vector graphics implemented via JavaScript may be used to generate, render, and/or cause the pop-up to be displayed based on an interaction with the interactive element. Any method or technique may be used to generate, render, and/or cause to be displayed the breadcrumb path, interactive elements, and/or a pop-up including the breadcrumb history.

Figure 4:
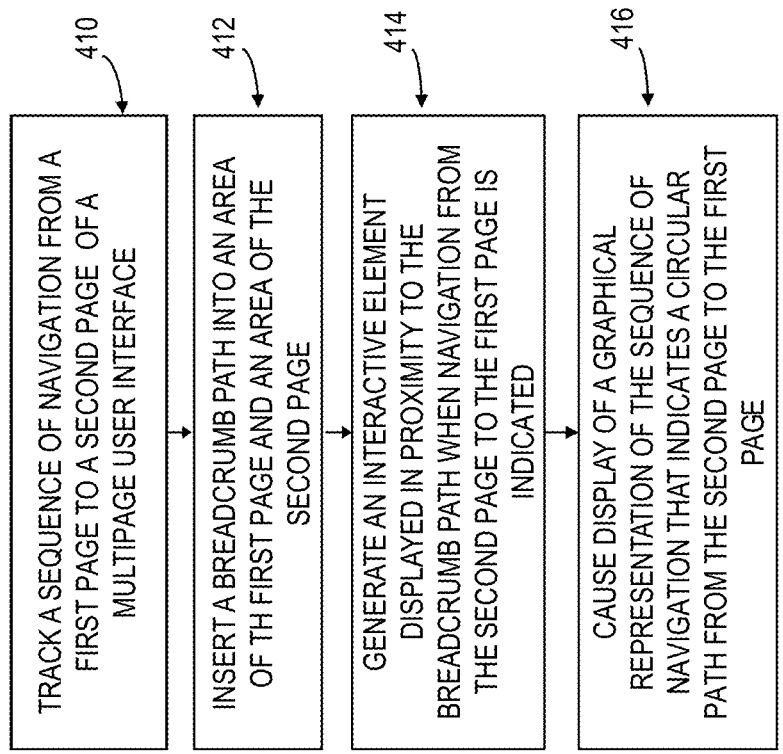
FIG. 4 shows a flowchart of an example method for managing circular navigation of a multipage user interface, according to some aspects.

FIG. 4 shows a flowchart of an example method 400 for managing circular navigation of a multipage user interface, according to some aspects. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to the aspects of those figures.

In 410, user device 104 tracks a sequence of navigation indicating navigation from a first page of a multipage user interface to a second page of the multipage user interface.

In 412, user device 104 inserts a breadcrumb path into an area of the second page. The user device 104 inserts the breadcrumb path into the area of the second page based on tracking the sequence of navigation. The breadcrumb path indicates a breadcrumb that corresponds to the second page ordered with a breadcrumb that corresponds to the first page. The user device 104 inserts the breadcrumb path into the area of the second page based at least in part on HyperText Markup Language (HTML) and at least in part on Cascading Style Sheets (CSS). For example, inserting the breadcrumb path into the area of the second page may be based at least in part on HyperText Markup Language (HTML) encoding, rendering, and/or the like, and at least in part on Cascading Style Sheets (CSS) encoding, rendering, and/or the like.

In 414, user device 104 generates an interactive element that is displayed in proximity to the breadcrumb of the breadcrumb path that corresponds to the first page. The user device 104 generates the interactive element that is displayed in proximity to the breadcrumb of the breadcrumb path that corresponds to the first page based on the sequence of navigation indicating navigation from the second page to the first page. The interaction with the interactive element may include at least one of a keyboard entry associated with the interactive element, a mouse click associated with the interactive element, or a tactile input associated with the interactive element.

In 416, user device 104 causes display of a graphical representation of the sequence of navigation. The user device 104 causes display of the graphical representation of the sequence of navigation based on an interaction with the interactive element. The graphical representation of the sequence of navigation indicates a circular path from the second page to the first page. The graphical representation of the sequence of navigation includes scalable vector graphics.

According to some aspects, the method 400 may include the user device 104 generating a rotatable element that is displayed within the center of the circular path. The user device 104 may generate the rotatable element that is displayed within the center of the circular path based on the sequence of navigation indicating an amount of additional pages of the multipage user interface navigated to intervening the navigation from the first page to the second page. An interaction with the rotatable element may cause the additional pages to be displayed.

According to some aspects, the method 400 may include the user device 104 generating another interactive element that is displayed in proximity to the interactive element. For example, the user device 104 may generate another interactive element that is displayed in proximity to the interactive element based on the sequence of navigation indicating navigation from a third page of the multipage user interface to the first page.

According to some aspects, the method 400 may include the user device 104 causing display of another graphical representation of the sequence of navigation. For example, the user device 104 may cause display of another graphical representation of the sequence of navigation based on an interaction with the another interactive element. The another graphical representation of the sequence of navigation may indicate another circular path from the third page to the first page.

Figure 5:
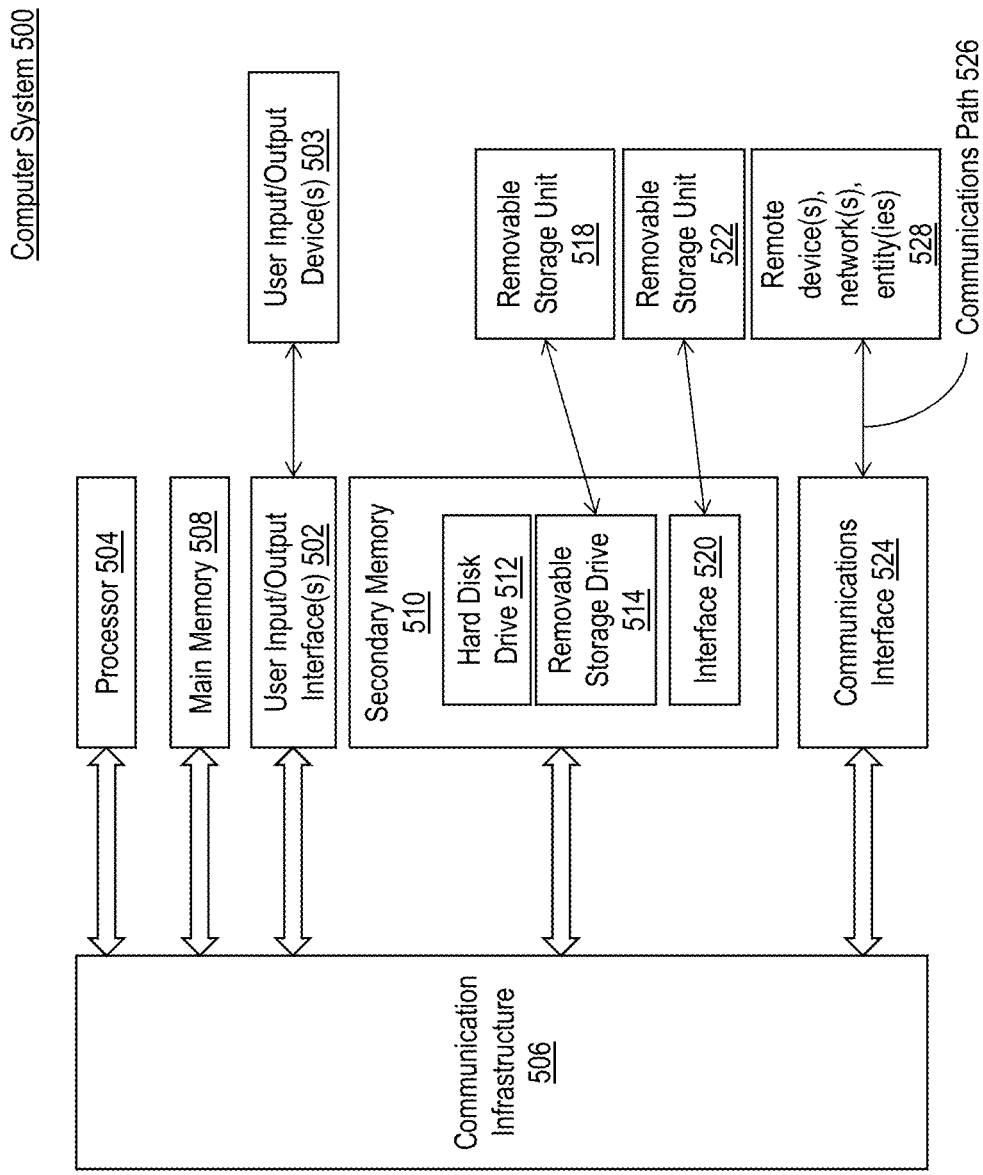
FIG. 5 shows a schematic block diagram of an example computer system in which aspects described may be implemented.

FIG. 5 is an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof. According to some aspects, the user device 104 of FIG. 1 (and/or any other device/component described herein) may be implemented using the computer system 500. According to some aspects, the computer system 500 may be used to implement method 400 and/or any other methods and/or steps described herein.

Computer system 500 may include one or more processors (also called central processing units, or CPUs), such as a processor 504. Processor 504 may be connected to a communication infrastructure or bus 506.

Computer system 500 may also include user input/output device(s) 502, such as monitors, keyboards, pointing devices, etc., which may communicate with communication infrastructure or bus 506 through user input/output device(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, a tape backup device, and/or any other storage device/drive.

Removable storage drive 514 may interact with a removable storage unit 518. The removable storage unit 518 may include a computer-usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to the removable storage unit 518.

Secondary memory 510 may include other means, devices, components, instrumentalities, and/or other approaches for allowing computer programs and/or other instructions and/or data to be accessed by computer system 500. Such means, devices, components, instrumentalities, and/or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "an aspect," "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for managing navigation of a multipage user interface comprising:
    tracking a sequence of navigation indicating navigation from a first page of a multipage user interface to a second page of the multipage user interface;
    inserting, based on tracking the sequence of navigation, a breadcrumb path into an area of the second page, wherein the breadcrumb path indicates a breadcrumb that corresponds to the second page ordered with a breadcrumb that corresponds to the first page;
    generating, based on the sequence of navigation indicating navigation from the second page to the first page, an interactive element that is displayed in proximity to the breadcrumb that corresponds to the first page; and
    causing, based on an interaction with the interactive element, display of a graphical representation of the sequence of navigation, wherein the graphical representation of the sequence of navigation indicates a circular path from the second page to the first page.

2. The method of claim 1, wherein the inserting the breadcrumb path into the area of the second page is based at least in part on HyperText Markup Language (HTML) and at least in part on Cascading Style Sheets (CSS).

3. The method of claim 1, wherein the graphical representation of the sequence of navigation comprises scalable vector graphics.

4. The method of claim 1, wherein the interaction with the interactive element comprises at least one of a keyboard entry associated with the interactive element, a mouse click associated with the interactive element, or a tactile input associated with the interactive element.

5. The method of claim 1, further comprising generating, based on the sequence of navigation indicating an amount of additional pages of the multipage user interface navigated to intervening the navigation from the first page to the second page, a rotatable element that is displayed within a center of the circular path, wherein an interaction with the rotatable element causes the additional pages to be displayed.

6. The method of claim 1, further comprising generating, based on the sequence of navigation indicating navigation from a third page of the multipage user interface to the first page, another interactive element that is displayed in proximity to the interactive element.

7. The method of claim 6, further comprising causing, based on an interaction with the another interactive element, display of another graphical representation of the sequence of navigation, wherein the another graphical representation of the sequence of navigation indicates another circular path from the third page to the first page.

8. A non-transitory computer-readable medium having instructions stored thereon that, when executed by at least one computing device, causes the at least one computing device to perform operations comprising:
    tracking a sequence of navigation indicating navigation from a first page of a multipage user interface to a second page of the multipage user interface;
    inserting, based on tracking the sequence of navigation, a breadcrumb path into an area of the second page, wherein the breadcrumb path indicates a breadcrumb that corresponds to the second page ordered with a breadcrumb that corresponds to the first page;
    generating, based on the sequence of navigation indicating navigation from the second page to the first page, an interactive element that is displayed in proximity to the breadcrumb that corresponds to the first page; and
    causing, based on an interaction with the interactive element, display of a graphical representation of the sequence of navigation, wherein the graphical representation of the sequence of navigation indicates a circular path from the second page to the first page.

9. The non-transitory computer-readable medium of claim 8, wherein the inserting the breadcrumb path into the area of the second page is based at least in part on HyperText Markup Language (HTML) and at least in part on Cascading Style Sheets (CSS).

10. The non-transitory computer-readable medium of claim 8, wherein the graphical representation of the sequence of navigation comprises scalable vector graphics.

11. The non-transitory computer-readable medium of claim 8, wherein the interaction with the interactive element comprises at least one of a keyboard entry associated with the interactive element, a mouse click associated with the interactive element, or a tactile input associated with the interactive element.

12. The non-transitory computer-readable medium of claim 8, further comprising generating, based on the sequence of navigation indicating an amount of additional pages of the multipage user interface navigated to intervening the navigation from the first page to the second page, a rotatable element that is displayed within a center of the circular path, wherein an interaction with the rotatable element causes the additional pages to be displayed.

13. The non-transitory computer-readable medium of claim 8, further comprising generating, based on the sequence of navigation indicating navigation from a third page of the multipage user interface to the first page, another interactive element that is displayed in proximity to the interactive element.

14. The non-transitory computer-readable medium of claim 13, further comprising causing, based on an interaction with the another interactive element, display of another graphical representation of the sequence of navigation, wherein the another graphical representation of the sequence of navigation indicates another circular path from the third page to the first page.

15. A system comprising:
    a memory; and
    at least one processor coupled to the memory and configured to perform operations comprising:

tracking a sequence of navigation indicating navigation from a first page of a multipage user interface to a second page of the multipage user interface;

inserting, based on tracking the sequence of navigation, a breadcrumb path into an area of the second page, wherein the breadcrumb path indicates a breadcrumb that corresponds to the second page ordered with a breadcrumb that corresponds to the first page;

generating, based on the sequence of navigation indicating navigation from the second page to the first page, an interactive element that is displayed in proximity to the breadcrumb that corresponds to the first page; and causing, based on an interaction with the interactive element, display of a graphical representation of the sequence of navigation, wherein the graphical representation of the sequence of navigation indicates a circular path from the second page to the first page.

16. The system of claim 15, wherein the inserting the breadcrumb path into the area of the second page is based at least in part on HyperText Markup Language (HTML) and at least in part on Cascading Style Sheets (CSS).

17. The system of claim 15, wherein the graphical representation of the sequence of navigation comprises scalable vector graphics.

18. The system of claim 15, wherein the interaction with the interactive element comprises at least one of a keyboard entry associated with the interactive element, a mouse click associated with the interactive element, or a tactile input associated with the interactive element.

19. The system of claim 15, further comprising generating, based on the sequence of navigation indicating an amount of additional pages of the multipage user interface navigated to intervening the navigation from the first page to the second page, a rotatable element that is displayed within a center of the circular path, wherein an interaction with the rotatable element causes the additional pages to be displayed.

20. The system of claim 15, further comprising:

generating, based on the sequence of navigation indicating navigation from a third page of the multipage user interface to the first page, another interactive element that is displayed in proximity to the interactive element; and causing, based on an interaction with the another interactive element, display of another graphical representation of the sequence of navigation, wherein the another graphical representation of the sequence of navigation indicates another circular path from the third page to the first page.

\* \* \* \* \*